(No Model.) 5 Sheets—Sheet 1.
M. C. JOHNSON.
TWIST DRILL MILLING MACHINE.
No. 541,550. Patented June 25, 1895.
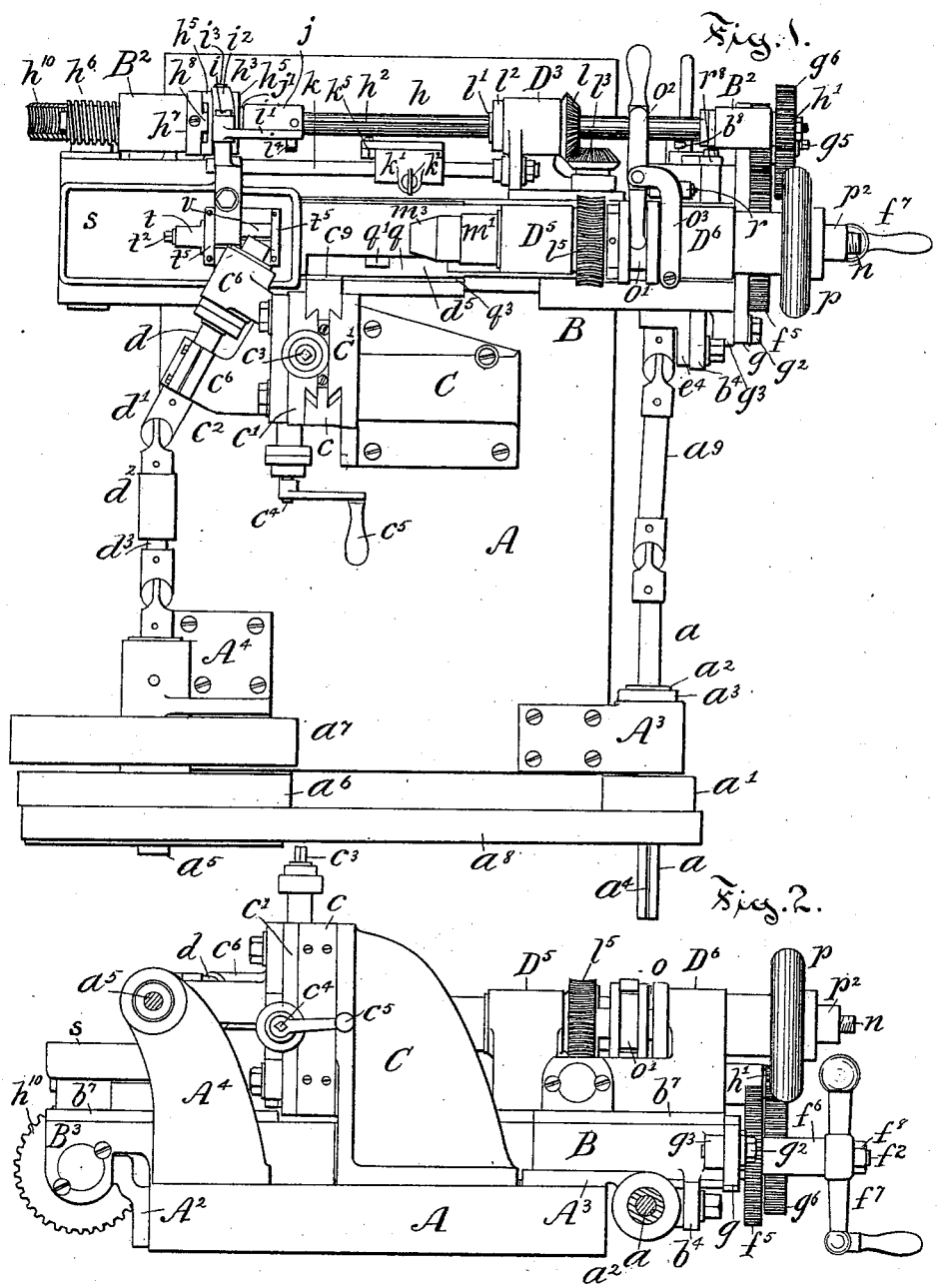
Witnesses:
Joseph Arth Cantin
Arthur B. Jenkins
Inventor:
Moses C. Johnson
By Chas. L. Burdett,
Attorney.

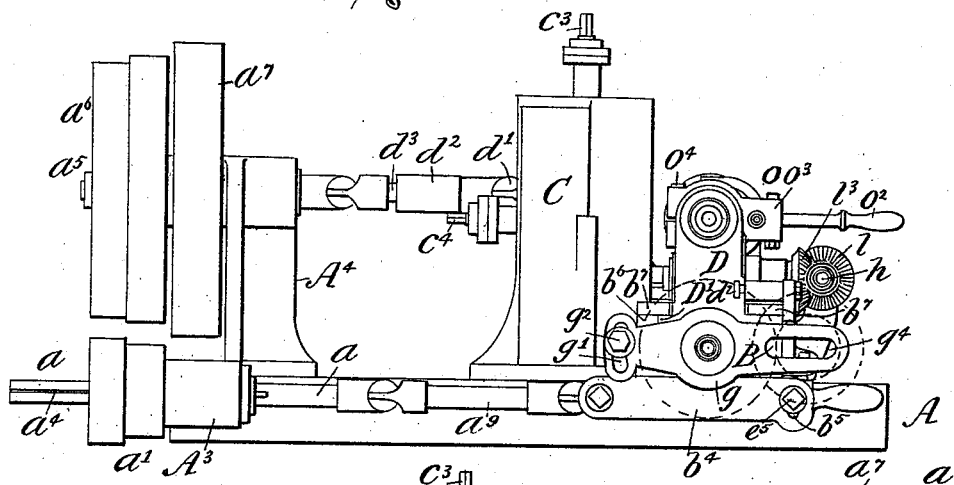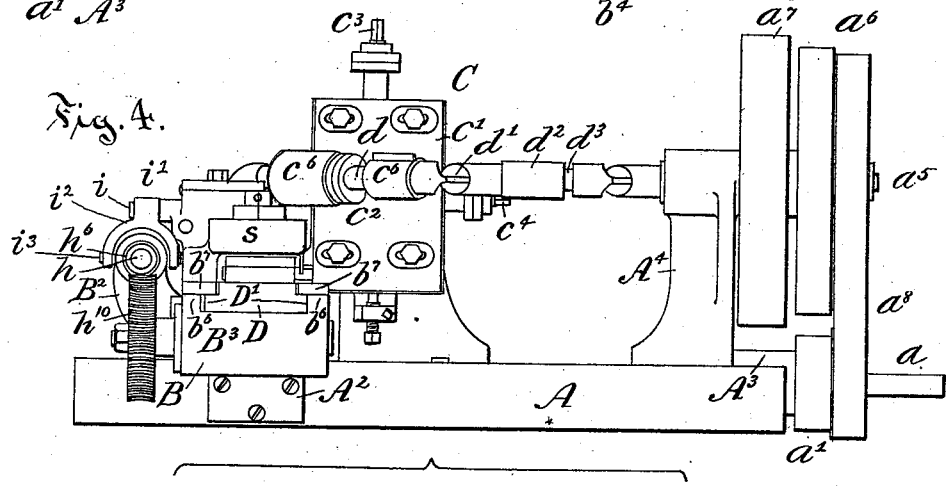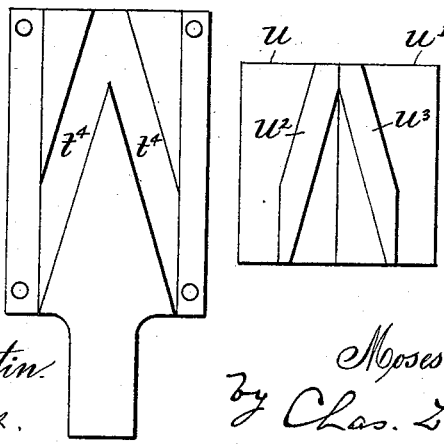

(No Model.)  5 Sheets—Sheet 3.
M. C. JOHNSON.
TWIST DRILL MILLING MACHINE.
No. 541,550.  Patented June 25, 1895.
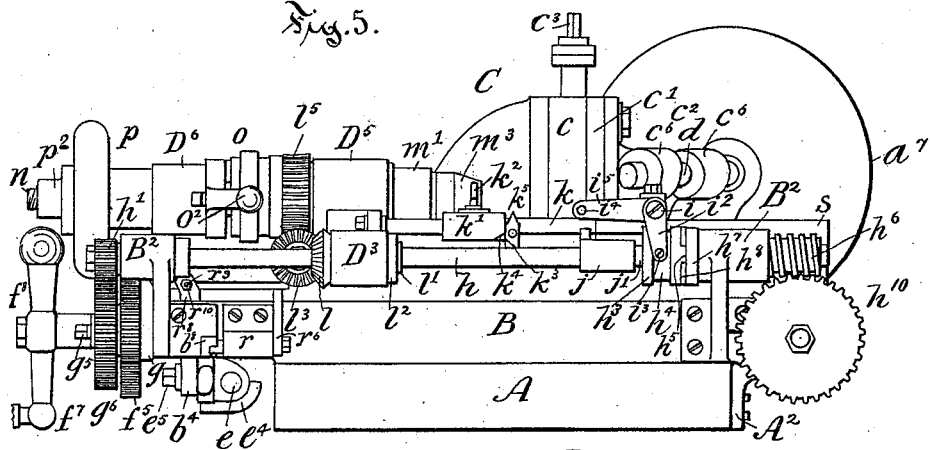
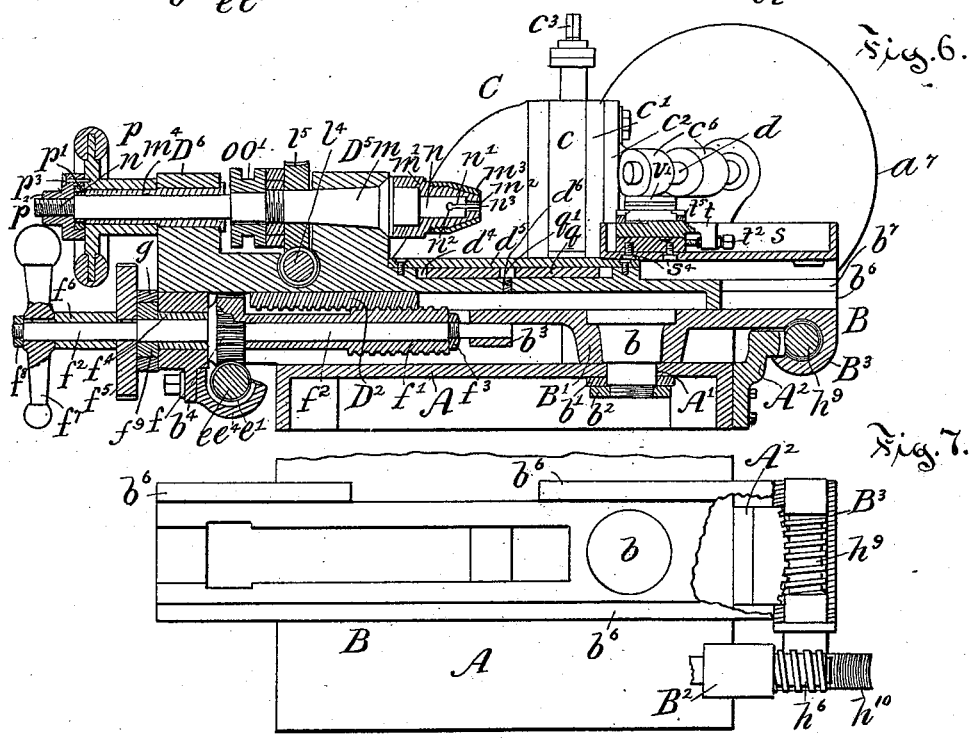
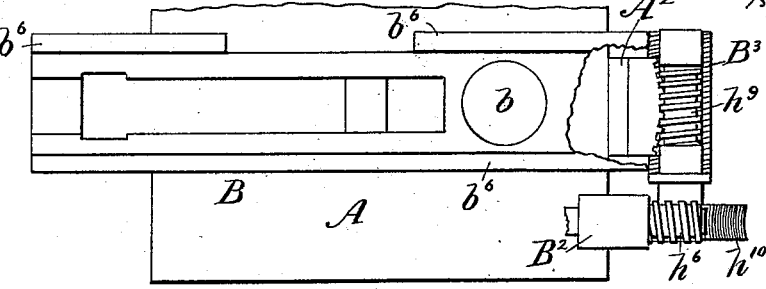

(No Model.) 5 Sheets—Sheet 4.
M. C. JOHNSON.
TWIST DRILL MILLING MACHINE.
No. 541,550. Patented June 25, 1895.
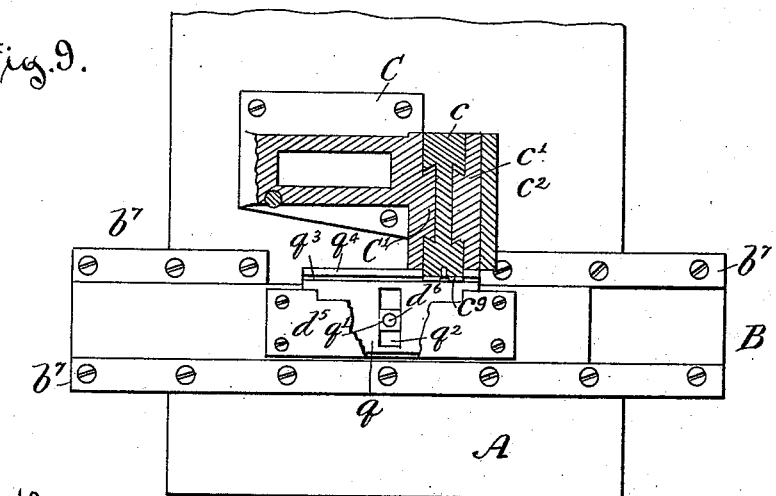
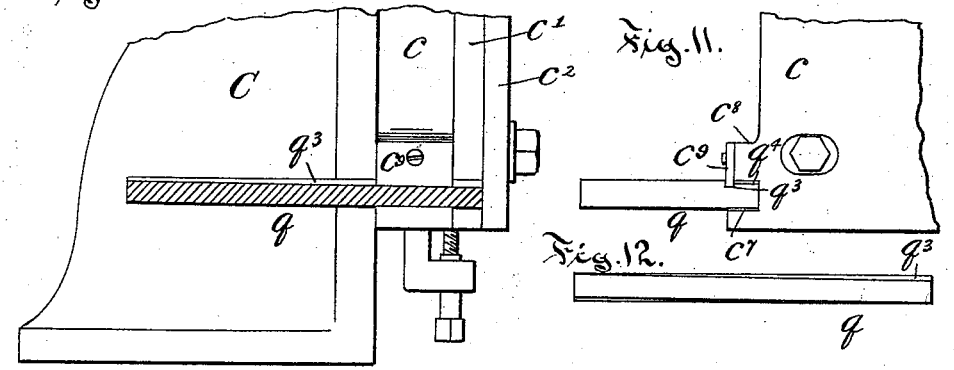
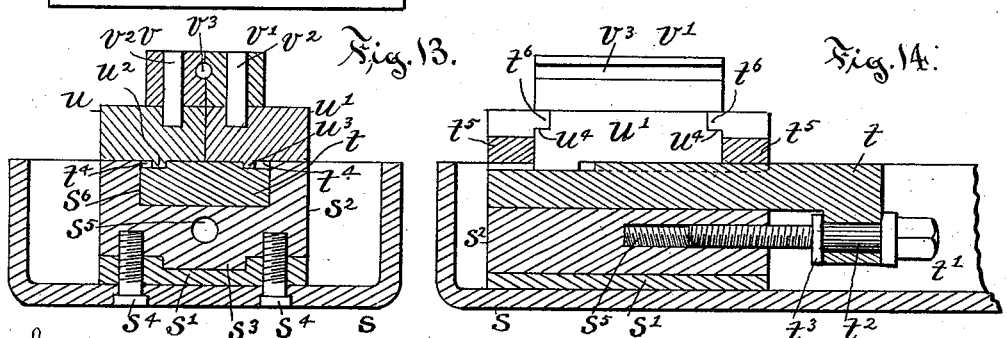
Witnesses:
Joseph Arth Cantin.
Arthur B. Jenkins.
Inventor:
Moses C. Johnson
By Chas. L. Burdett,
Attorney (No Model.) 5 Sheets—Sheet 5.
M. C. JOHNSON.
TWIST DRILL MILLING MACHINE.
No. 541,550. Patented June 25, 1895.
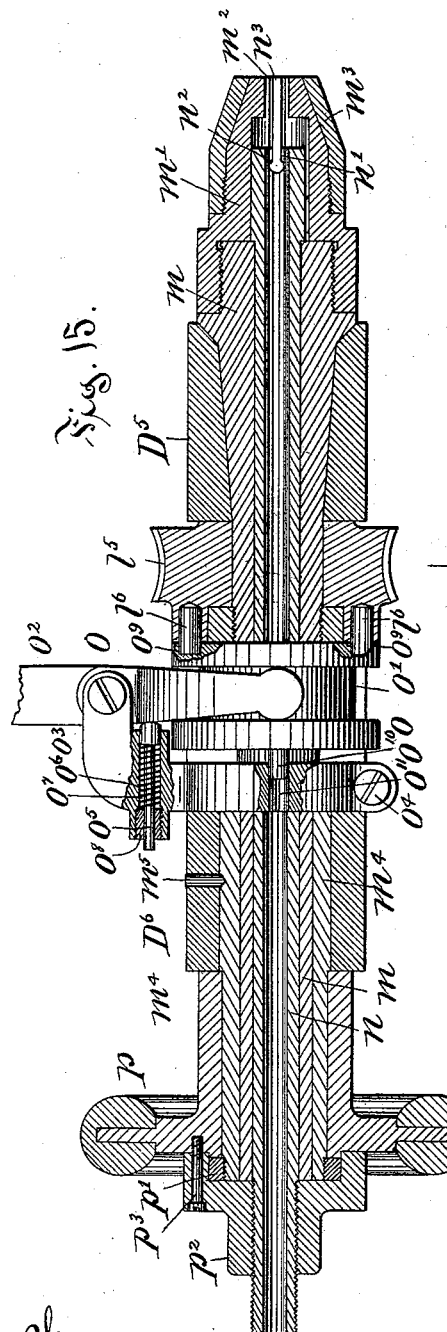
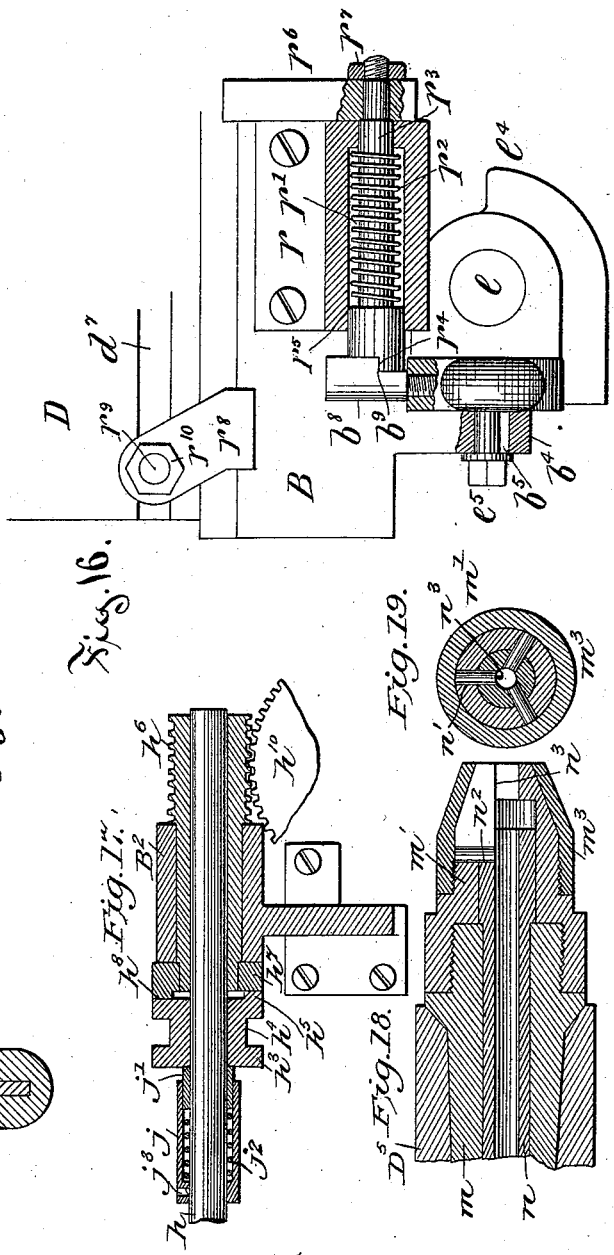
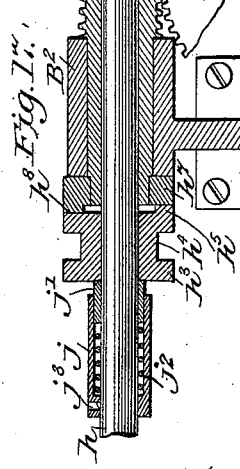
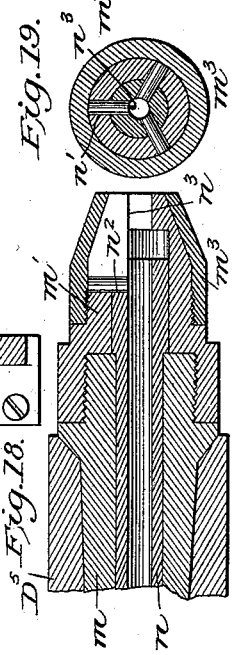
Witnesses:
Joseph Arth Cantin
Arthur B. Jenkins
Inventor:
Moses C. Johnson
by Chas. L. Burdett,
Attorney

UNITED STATES PATENT OFFICE.

MOSES C. JOHNSON, OF HARTFORD, ASSIGNOR TO THE T. & B. TOOL COMPANY, OF DANBURY, CONNECTICUT.

TWIST-DRILL-MILLING MACHINE.

SPECIFICATION forming part of Letters Patent No. 541,550, dated June 25, 1895.

Application filed May 7, 1894. Serial No. 510,327. (No model.)

*To all whom it may concern:*

Be it known that I, MOSES C. JOHNSON, of Hartford, in the county of Hartford and State of Connecticut, have invented certain new and useful Improvements in Twist-Drill-Milling Machines, of which the following is a full, clear, and exact description, whereby any one skilled in the art can make and use the same.

The object of my invention is to provide a machine by means of which an improved twist drill may be manufactured, the machine combining means for producing a twist drill with a groove of any desired pitch and depth and consequent thickness of the web.

To this end my invention consists in the details of the several parts making up the machine as a whole and in the combination of such parts as more particularly hereinafter described and pointed out in the claims.

Referring to the drawings, Figure 1 is a plan view of my improved milling-machine. Fig. 2 is a rear view of the same with the pulley and cone shafts cut in section immediately back of their rear bearings. Fig. 3 is a view in side elevation looking from the right of Fig. 1, with change-gear yoke removed and gears indicated by dotted outline. Fig. 4 is a view in side elevation looking from the left of Fig. 1. Fig. 5 is a view in front elevation of the machine. Fig. 6 is a view in vertical section of the machine on a plane lengthwise of and through the axes of the drill-spindle and feed-shaft. Fig. 7 is a detail top or plan view of a part of the table and of the drill-slide saddle and part of its operating mechanism, with part broken away. Fig. 8, Sheet 2, is a detail top view of the drill-guide slide and bottom view of the drill-guide base, the faces shown being adapted to engage each other, scale enlarged. Fig. 9 is a detail top or plan view, with parts broken away, showing a portion of the top of the table, the drill-slide saddle, the cutter-head slides, and the head taper slide and their method of engagement. Fig. 10 is a detail view of the cutter-head-slide knee, the cutter-head slides, and in section of the head taper slide cut through the groove in the latter and looking toward the cutter-head slides, on enlarged scale. Fig. 11 is a detail edge view of the head taper slide, showing its engagement with the cutter-head slides, scale enlarged. Fig. 12 is a detail edge view of the head taper slide looking from the cutter-head slides, scale enlarged. Fig. 13 is a detail view, in crosswise section, through the drill-guide box and the drill-guide mechanism borne therein, scale enlarged. Fig. 14 is a detail view, in lengthwise section, through the same, scale enlarged. Fig. 15 is a detail view, on enlarged scale, in central vertical section, through the drill-holding spindle. Fig. 16 is a detail view, on enlarged scale, of the feed trip device, with parts broken away to show construction. Fig. 17 is a detail view, in lengthwise section, through the spring-case appurtenant to the clutch mechanism for controlling the movement of the saddle-swinging devices. Fig. 18 is a detail view, in lengthwise section, through the forward end of the chuck-body, showing the jaws and the manner in which they are attached to the spindle and plunger, said view being taken on a different plane from the plane of section of Fig. 14. Fig. 19 is a detail view, in cross-section, through the chuck-jaws on a plane passing through the enlarged end.

In the accompanying drawings the letter A denotes a table or support on which the machine as a whole is mounted. An opening A' is made through this table near the front and at one side thereof, the hub B' of the drill slide saddle B resting on the table adjacent to this hole A'. A hole is made centrally through this hub B' into which is inserted, as shown, the saddle pivot $b$, the lower end of which is threaded and bears a washer and nut $b'$, $b^2$, that hold the pivot securely in place on the table. A saddle worm segment $A^2$ is secured to one side of the table, the segment projecting upward and outward therefrom. To the rear side of the table are secured the cone shaft bearing $A^3$ and pulley shaft bearing $A^4$. Each of these bearings is of considerable width and in the bearing $A^3$ is borne the cone shaft $a$ to which is secured the small feed cone pulley $a'$, a sleeve $a^2$ integral with the small feed cone pulley $a'$ extending through the bearing $A^3$ and having secured thereto the collar $a^3$ to prevent the pulley from moving endwise. The cone shaft $a$ has a lengthwise groove $a^4$ in which is borne a spline engaging with the small feed cone pulley $a'$, this construction allowing the feed cone shaft a free lengthwise movement within the pulley, but compelling the rotation of the shaft and pulley together. The pulley is held against lengthwise movement. Within the bearing $A^4$ is supported the pulley shaft $a^5$ to which are secured the large cone pulley $a^6$ and the driving pulley $a^7$. The driving pulley $a^7$ may be rotated from any source of power and the rotation of the pulley shaft is communicated to the small feed cone shaft by means of the belt $a^8$.

Cutter-Spindle Driving Mechanism.

The cutter head slide knee C is secured to the table A as by means of bolts or screws passing through flanges at the bottom, the central portion of this knee being hollowed out, as shown in Fig. 9, for purposes of lightness. On one side of the knee is formed a dovetail projection $C'$ and borne on this dovetail projection is the intermediate slide $c$ having a dovetail groove fitting the projection $C'$ on one side and on the opposite side a dovetail groove fitting the dovetail projection on the cutter head slide $c'$. The cutter head $c^2$ is adjustably secured to the cutter head slide $c'$ by means of bolts passing through slots in the former. The cutter head slide $c'$ is adjustable vertically upon the intermediate slide by means of an intermeshing feed screw $c^3$ on the one part engaging a threaded nut on the opposite part, the outer end of this feed screw being of an angular shape to receive a wrench or a handle as a means of turning it. The cutter head $c^2$ is adjustable horizontally on the cutter head slide $c'$ by means of a feed screw $c^4$ on the one part fitting a threaded nut on the opposite part and this feed screw may be provided with a handle $c^5$ as a means of turning the latter, the bolts passing through the slots in the cutter head and into the cutter head slide clamping the former in place when the desired adjustment has been attained.

Projections $c^6$ are formed on the cutter head and in these projections bearings for the cutter spindle $d$ are formed, this cutter spindle being mounted in the bearings in any manner desired and bearing on its inner end a cutter suitably secured thereto.

To the other end of the spindle is secured one end of a universal ball joint $d'$, the opposite end of this joint being secured to the joint shaft socket $d^2$ and splined within this socket and rotating therewith, but having a free longitudinal movement therein, is the joint shaft $d^3$, to the opposite end of which is secured one end of another universal ball joint similar to the one just described, the opposite end of this ball joint being secured to the pulley shaft $a^5$ by means of which, through the above described mechanism, rotary movement is imparted to the cutter borne on the cutter spindle $d$. By means of this mechanism a vertical movement of the cutter spindle through the medium of the slides may be had and the slides may be adjusted as desired one upon the other, the universal ball joints, and the longitudinal movement of one portion of the shaft within another permitting any desired degree of this adjustment.

Drill-Blank-Feeding Mechanism.

The drill blank feeding mechanism is constructed as follows: To one end of the cone shaft $a$ is secured by means of a universal ball joint one member $a^9$ of the cone shaft $a$, the opposite end of this member $a^9$ being secured by means of a universal ball joint to the feed worm shaft $e$ bearing a feed worm $e'$ in mesh with the feed worm gear $f$. The feed worm shaft $e$ is mounted in bearings in the feed swivel box $e^4$ that is pivoted at one end to a downward projection $b^4$ near one end of the drill slide saddle B and preferably integral therewith. In the opposite end of this downward projection a slot $b^5$ is formed through which a bolt $e^5$ from the feed swivel box extends, this bolt and slot allowing the feed swivel box to have a vertical movement.

The feed worm $e'$ is in mesh with a feed worm gear $f$ secured to one end of and preferably integral with the feed screw $f'$. This feed screw is secured to the feed shaft $f^2$ one end of which has a bearing in a downward projection $b^3$ from the under side of the saddle B, a nut $f^3$ fitting a threaded portion on the feed shaft and resting against one end of the feed screw and holding it against lengthwise movement toward the projection $b^3$. A flanged sleeve $f^4$ is borne on the feed shaft $f^2$ one end resting against the feed worm gear $f$ and preventing endwise movement in this direction, the inner end of this flanged sleeve being borne in the body of the drill slide saddle B. A change gear yoke to be hereinafter described is pivoted on the flanged part $f^9$ of this sleeve, and secured to the feed shaft and resting against the flange and change gear yoke is a gear $f^5$. Mounted on the feed shaft outside of this gear $f^5$ is a sleeve $f^6$ and also mounted on the shaft and resting against this sleeve is a handle $f^7$ that is held in place by means of the nut $f^8$ secured to the outer threaded end of the feed shaft.

Upward projecting flanges $b^6$ preferably integral with the body of the drill slide saddle are formed on each side of the latter, the space between these flanges affording a slide way for the drill slide which is borne therein, and on these flanges $b^6$ are secured the drill slide straps $b^7$, the straps extending beyond the edge of the flanges and over projecting feet $D'$ on the drill slide D, the latter being held against removal by means of the mechanism described. On the under side of the drill slide D and in mesh with the feed screw $f'$ is secured a feed screw nut $D^2$. The mechanism above described provides for the feeding movement of the drill slide saddle, and a drill blank borne thereon lengthwise of the cutter, the forward movement of this drill slide being given by the mechanism described, the handle $f^7$ being used for a quick return of the slide.

Saddle-Swinging Mechanism.

A change gear yoke $g$ is pivoted on the flanged part $f^9$ of the sleeve $f^4$ one end of the yoke containing a slot $g'$ through which passes a bolt $g^2$ fitting a screw threaded opening in the lateral projection $g^3$ near one end of the drill slide saddle B. The opposite end of this change gear yoke has a lengthwise slot $g^4$ within which is adjustably secured the change gear stud $g^5$ bearing a double change gear $g^6$. This double change gear consists of a small gear in mesh with the gear $f^5$ secured to the feed shaft $f^2$ and a larger gear in mesh with the pinion $h'$ secured to the bevel gear shaft $h$. The stud $g^5$ is made adjustable in the yoke $g$ for the purpose of allowing different sizes of gears to be interposed between the feed shaft $f^2$ and the pinion $h'$ for varying the speed of parts of the mechanism.

The bevel gear shaft $h$ is mounted at each end in bearings $B^2$ secured to the drill slide saddle B and centrally in the bearing $D^3$ secured to the drill slide D. A lengthwise groove $h^2$ is formed in the bevel gear shaft $h$ and to this shaft near one end is secured the shaft clutch $h^3$ having an annular groove $h^4$ and projections $h^5$.

Pivoted on the stud $i$ secured to the drill guide box to be hereinafter described is an L-shaped shaft clutch yoke $i'$, one member $i^2$ of which is forked and rests on each side in the annular groove $h^4$ in the shaft clutch $h^3$. Screws $i^3$ project through each fork and on the inner ends are secured shoes resting in the annular groove $h^4$ in the clutch. This shaft clutch $h^3$ is splined to the bevel gear shaft $h$ and has a limited longitudinal movement thereon. The worm $h^6$ is secured to the outer end of the bevel gear shaft $h$, a sleeve on this worm extending through the bearing $B^2$ and projecting beyond the opposite edge of the said bearing, and to this end of the sleeve is secured the shaft clutch disk $h^7$ having projections $h^8$ adapted to engage the projections $h^5$ on the shaft clutch $h^3$. This construction enables the worm gear $h^6$ to be thrown into or out of engagement with the bevel gear shaft $h$ by the movement of the shaft clutch yoke $i'$.

The saddle worm $h^9$ is mounted in the bearings $B^3$ located in downward projections from the under side of the drill slide saddle B and to one end of this worm and in mesh with the worm $h^6$ is a worm gear $h^{10}$ through the medium of which rotary movement is communicated from the bevel gear shaft to the worm $h^9$. This worm $h^9$ is in mesh with the saddle worm segment $A^2$ secured to the table. By the rotation of the worm $h^9$ through the medium of the bevel gear shaft $h$ a swinging movement is imparted to the drill slide saddle B on the pivot $b$. It is to be noted that the center of this pivot is located directly under and in line with the diameter of the cutter secured to the cutter spindle $d$.

A spring case $j$ is secured to the bevel gear shaft $h$, as by means of the screw $j^3$, a shoulder being formed within this case and one end of a spiral spring $j^2$ rests on this shoulder, the opposite end of said spring thrusting against the plunger $j'$ that in turn thrusts against the shaft clutch $h^3$ tending to normally keep these clutch parts in engagement.

A knock off rod $k$ is supported at one end in the bearing $D^3$ and at its opposite end in the drill guide box and to this rod is secured the clutch knock-off $k'$ by means of a binding screw $k^2$. This knock-off $k'$ has on its lower edge a projection $k^3$ and a beveled under surface $k^4$ and to the projection $k^3$ is pivoted the knock-off latch $k^5$. The upper ends of this knock-off latch are beveled in opposite directions lengthwise of the movement of the rod $k$ on the drill slide carriage, and the upper end of this latch is so located as to come in contact with the under side of a pin $i^4$ in the arm $i^5$ of the shaft clutch yoke $i'$, throwing the arm upward and consequently the clutch parts out of engagement. This mechanism provides an automatic device whereby the clutch parts are thrown out of engagement and the swinging movement of the carriage stopped, the clutch knock-off $k'$ being adjustably secured to the rod $k$ so that this disengagement of the clutch parts is insured at any predetermined time.

Drill-Blank Holding and Rotating Mechanism.

A bevel gear $l$ is splined to the bevel gear shaft $h$ in such manner as to turn therewith but to have a longitudinal movement thereon, and a sleeve $l'$ secured to this bevel gear $l$ extends completely through the bearing $D^3$ projecting on the opposite side and on this end of the sleeve $l'$ is secured, by means of engaging screw threaded parts, the nut $l^2$, this nut resting against a shoulder on the sleeve in such manner as to prevent any binding of the nut upon the bearing $D^3$. The bevel gear $l$ is in mesh with a bevel gear $l^3$ secured to the twist worm $l^4$. This twist worm is borne in suitable bearings in the drill slide D and is in engagement with the worm gear $l^5$ loosely mounted on the drill spindle $m$.

The drill spindle $m$ is mounted in bearings $D^5$, $D^6$, on the drill slide D. This spindle is tubular and located therein and extending therethrough is the chuck plunger $n$. This plunger $n$ is keyed to the chuck body and contains at one end the slots $n'$, the inner ends of which are enlarged as at $n^2$. The chuck jaws $n^3$ are constructed of a form to fit these slots and having an enlarged end fitting the enlarged opening $n^2$. These jaws are inserted in the plunger radially thereof and this construction of the openings $n'$, $n^2$, permits only a radial movement of the jaws. A chuck body $m'$ is secured on the screw threaded end of the drill spindle, the chuck plunger $n$ extending into this chuck body $m'$. This chuck body is also provided with radial slots $m^2$ which register with the slots $n'$ in the plunger, the chuck jaws $n^3$ extending through the walls of the chuck body to the outer surface thereof. The chuck cap $m^3$ is secured to the threaded portion of the chuck body $m'$, the inner surface of the outer end of the cap being beveled to fit the beveled edges of the chuck jaws. This construction gives to the chuck jaws a radial movement as the cap $m^3$ is moved lengthwise on the chuck body or as the chuck plunger is moved longitudinally within the spindle, the construction affording means whereby a drill blank may be securely held between the jaws.

A drill spindle clutch $o$ is splined to the drill spindle $m$, has a limited sliding movement thereon, and rotates with it. An annular groove $o'$ is formed in the drill spindle clutch and in this groove and on diametrically opposite sides thereof rests the forked ends of the indexing handle $o^2$. This handle is pivoted in the clutch yoke $o^3$ that is clamped to the clutch yoke bushing $m^4$ as by means of the screw $o^4$. In a socket in this clutch yoke is mounted a plunger $o^5$ that is normally thrust against the indexing handle by means of the spring $o^6$ that is located in the chamber $o^7$ with one end thrusting against the plug $o^8$ and the other against a shoulder on the plunger. This plug $o^8$ has a central hole therein through which projects one end of the plunger. Clutch pins $l^6$ are secured in the worm gear $l^5$ and are adapted to engage recesses $o^9$ in the drill spindle clutch $o$, these recesses $o^9$ being located to correctly register with the pins, each of the pins engaging the recesses at the same time. In the opposite side of the drill spindle clutch $o$ is located a pin $o^{10}$ that is adapted to engage the recess $o^{11}$ in the clutch yoke $o^3$. The pins $o^9$ and $o^{10}$ are constructed of such a length that one will engage its recess at the same time or a little later than the time that the other is leaving its recess. This construction enables the drill spindle to be thrown into or out of engagement at will with the worm gear $l^5$.

The bushing $m^4$ is mounted on the drill spindle $m$ and is held against rotation by means of the pins $m^5$, and on this bushing is rotarily mounted the hand wheel $p$ which is held in place by means of the nut $p'$ fitting the outer threaded end of the bushing. The chuck hand wheel nut $p^2$ is secured to the hand wheel by means of the screw $p^3$. This nut has a central opening which is screw threaded, and the screw threaded end of the chuck plunger $n$ fits this screw threaded opening so that when the nut $p^2$ is turned as by means of the hand wheel $p$ a longitudinal movement of the chuck plunger is caused, and this is used for the purpose of clamping a drill blank between the chuck jaws $n^3$, the chuck cap $m^3$ being tightly secured to the chuck body $m'$.

Taper-Slide Mechanism.

A socket $d^4$ is formed in the drill slide D and is covered by a plate $d^5$ that is secured as by means of screws to the upper surface of the drill slide. A taper slide stud $d^6$ is secured to the drill slide as by means of interengaging screw threaded parts, and rotarily mounted on the upper end of this stud is a stud bushing $q'$ that is angular in form in cross section and is located in the slot $q^2$ in the taper slide $q$. This taper slide $q$ is located in the recess $d^4$ in the drill slide and the construction just described enables the taper slide to have a sliding movement laterally of the drill slide and at the same time a rotary movement on the stud $d^6$. A groove $q^3$ is located in the upper surface of this taper slide, the groove being deeper at the right hand end (Fig. 9) than at the left hand end, that is, it slants downward from the left to the right, as seen in said figure, and the upper surface of the projection $q^4$ located between this groove and its nearest edge is parallel to the bottom of the groove, that is, it is also inclined from left to right. The edge of this taper slide $q$ projects into a groove $c^7$ formed in the projection $c^8$ on the intermediate slide $c$. A taper slide strap $c^9$ is secured to the upper one of the projections $c^8$, the lower edge of the strap projecting into the groove $q^3$. This construction necessitates an upward movement of the intermediate slide $c$ and consequently of the cutter spindle $d$ and the cutter located thereon, as the drill slide is moved toward the right (Figs. 5, 6 and 9 of the drawings). This construction is for the purpose of thickening the web in the drill blank being milled as the groove cut therein approaches the shank, the taper slide strap $c^9$ preventing any disengagement of the taper slide $q$ from the intermediate slide $c$.

Feed Knock-Off Mechanism.

A feed latch pin $b^8$ is secured to the upper edge of the feed swivel box $e^4$, a shoulder $b^9$ being formed on the side of this pin. A plunger case $r$ is secured to the side of the drill slide saddle B and in this case is a plunger chamber $r'$ within which is located a spiral spring $r^2$. The plunger $r^3$ is also located in this chamber and one end of it has a shoulder $r^4$ adapted to engage the shoulder $b^9$ on the feed latch pin $b^8$. The spring $r^3$ thrusts against the spring shoulder $r^5$ on the plunger and tends to normally hold the plunger and latch pin in engagement. A feed knock off arm $r^6$ is secured to the outer end of the plunger $r^3$ as by means of a nut $r^7$, this arm projecting above the edge of the plunger case. A feed knock off $r^8$ is adjustably secured to the drill slide D by means of a headed stud $r^9$, the head of which fits in a longitudinal slot $d^7$ extending lengthwise in the body of the drill slide D, a nut $r^{10}$ being fitted on the outer screw threaded end of this stud to clamp the feed knock off securely in position. This knock off is preferably keyed to the stud to prevent rotation. The path of movement of this feed knock off is in line with the feed knock off arm $r^6$ and extends downward far enough to engage said arm in the lengthwise movement of the drill slide. This construction provides for the automatic release of the feed worm $e'$ from the feed worm gear $f$ and the consequent stopping of all the mechanism located on the drill slide saddle, the feed swivel box $e^4$ dropping by gravity as soon as the feed knock off plunger is released from engagement with the feed latch pin.

Drill-Guide Mechanism.

A drill guide box $s$ is secured to the top of the drill slide saddle B at the end adjacent to the cutter spindle $d$, the cutter being located on the cutter spindle in such position as to overlie this drill guide box, that is of pan shape and constructed to receive the oil and chips that accumulate in the cutting of the drill blank, a suitable outlet being provided to carry off this accumulation. Secured within this drill guide box $s$, as by means of screws $s^4$, is a base $s'$ having a lengthwise groove therein. This base may be made integral with the box if desired; and secured to the box and base is a drill guide holder $s^2$ having a tongue $s^3$ projecting within the groove in the base, thus preventing any sidewise movement of the two parts on each other, the screws $s^4$ extending upward through the drill guide box into the drill guide holder $s^2$.

A screw threaded opening $s^5$ extends lengthwise through the body of the drill guide holder $s^2$ and in it fits a screw threaded bolt $t^2$ passing through a downward projecting part $t'$ from one end of the drill guide slide $t$. This bolt $t^2$ is held against lengthwise movement but free to rotate within the projection $t'$ by means of a washer $t^3$ secured to the bolt on the opposite side of the projection from the head thereof. This drill guide slide $t$ is located in a groove $s^6$ in the drill guide holder $s^2$ and has a sliding movement longitudinally therein. In the upper surface of this drill guide slide are formed diagonal grooves $t^4$, the grooves extending from the outer edges of the slide at the end bearing the projection $t'$ to a point where they meet at the opposite end of the slide.

A drill guide base consisting of two members $u$ and $u'$ rests upon the upper surface of the drill guide holder and drill guide slide and on the under surface of each member of the drill guide base are tongues $u^2$, $u^3$, fitting the diagonal grooves $t^4$ in the drill guide slide $t$. The drill guide straps $t^5$ are secured, as by means of screws, to the upper side of the drill guide slide $t$ near each end thereof, these drill guide straps having lips $t^6$ overhanging the feet $u^4$ on each of the drill guide bases $u$ and $u'$, this construction allowing of a sidewise movement of the drill guide bases $u$ and $u'$ but preventing any longitudinal movement. As the drill guide slide $t$ is given a longitudinal movement by means of the bolt $t^2$ the tongues on the under side of the drill guide bases lying in the diagonal grooves $t^4$ in the drill guide slide cause the drill guide bases $u$ and $u'$ to move laterally. Drill guides $v$ and $v'$ are secured to the upper surface of the drill guide bases $u$ and $u'$ respectively as by means of pins $v^2$, the drill guides moving laterally with the bases. These drill guides are adapted to lie with their sides in proximity or against each other and in these adjacent surfaces and running lengthwise of the drill guide are grooves or channels forming a guide opening $v^3$ into which a drill blank held within the drill spindle chuck $o$ is adapted to project.

The operation of the machine briefly stated is as follows: A drill blank having been clamped in the drill holder by the mechanism described, and the shafts $a^9$ and $d^3$ being rotated the feed swivel box $e^4$ is raised bringing the worm $e'$ into engagement with the worm gear $f$. This action sets the whole mechanism in motion, the drill slide D being fed forward and the drill blank being moved along underneath the cutter that operates upon it to cut a groove. The blank is also projected into the drill guide described. The engagement of the taper slide $q$ with the cutter head slides causes the cutter to be moved upward, this operation increasing the thickness of the web as the drill blank is fed forward. In this forward movement of the drill slide the spindle $m$ is given a slow rotation which causes a spiral groove to be cut in the drill blank. At the same time that the drill slide is fed forward the drill slide saddle B is given a swinging movement on the pivot $b$ by means of the mechanism described. This causes the groove in the drill blank to be cut of a uniform width from point to shank as the cutter is drawn away from the axis of the blank, this result being possible from the fact that the pivot $b$ is located directly in line with the diametrical axis of the cutter. This causes the groove in the drill blank to be cut with any proportion between its width at the point and at the shank as may be determined by the relation between the longitudinal and axial movements of the carriage, as the cutter is drawn away from the axis of the blank, this result being possible from the fact that the pivot $b$ is located directly in line with the diametrical axis of the cutter.

I claim as my invention—

1. In combination in a machine for grooving drills, a frame or bed, a reciprocating drill blank holder mounted on a pivoted saddle, the saddle pivoted on the bed, means for imparting a lateral swinging movement to the drill holding spindle, means for reciprocating the holder, and a cutter having its diametrical axis in alignment with the saddle pivot, all substantially as described.

2. In combination in a machine for grooving drills, a frame or bed, a reciprocating drill blank holder mounted on a slide saddle, the saddle pivoted on the bed, means for imparting a lateral swinging movement to the drill holding spindle, means for reciprocating the holder, a cutter having its diametrical axis in alignment with the saddle pivot, and means for varying the distance between the axis of the drill holder and the cutter, all substantially as described.

3. In combination in a machine for grooving drills, a frame or bed, a reciprocating drill slide supported on the swinging saddle, means for reciprocating the slide, the drill spindle borne on the drill slide, the saddle pivoted to the bed, means for imparting a sidewise swinging movement to the saddle, the cutter having its diametrical axis in alignment with the saddle pivot, and means for moving the cutter away from the line of the axis of the drill spindle, all substantially as described.

4. In combination in a machine for grooving drills, a frame or bed, a cutter spindle borne on a movable slide, a reciprocating drill blank holder mounted on a pivoted saddle, the saddle pivoted on the bed, a laterally movable taper slide pivotally supported on the saddle and having a beveled surface in engagement with the slide supporting the cutter spindle, means for imparting a lateral swinging movement to the drill holding spindle, and means for reciprocating the holder, all substantially as described.

5. In combination in a machine for grooving drills, a frame or bed, a cutter spindle borne on a movable slide, a reciprocating drill blank holder mounted on a pivoted saddle, the saddle pivoted on the bed, a laterally movable taper slide pivotally supported on the saddle and having a beveled surface in engagement with the slide supporting the cutter spindle, a lip on one of said parts engaging a groove in the opposite part, means for imparting a lateral swinging movement to the drill holding spindle, and means for reciprocating the holder, all substantially as described.

6. In combination with the reciprocating and pivoted drill holder of a machine for grooving drills, a taper slide supported in operative relation to the holder, the bushing in sliding engagement with the taper slide, the pivot in engagement with the bushing, the beveled surface on the taper slide, the groove on the taper slide, the cutter spindle slide in engagement with said beveled surface and groove, means for reciprocating the holder, and means for giving it a lateral swinging movement, all substantially as described.

7. In combination in a machine for grooving drills, a frame or bed, a reciprocating drill blank holder supported on a swinging saddle, means for reciprocating the holder, the gear rotarily mounted on the holder, the clutch mechanism for securing the gear to the holder, the saddle pivoted on the bed, means for imparting a lateral swinging movement to the saddle, and a cutter spindle mounted in operative relation to the drill blank holder, all substantially as described.

8. In combination in a machine for grooving drills a frame or bed, a reciprocating drill blank holder supported on a swinging saddle, means for reciprocating the holder, the gear rotarily mounted on the holder, the clutch device secured to the holder, means for automatically engaging the gear and clutch device, the saddle pivoted on the bed, means for imparting a lateral swinging movement to the saddle, and a cutter spindle mounted in operative relation to the drill blank holder, all substantially as described.

9. In combination in a machine for grooving drills, a frame or bed, a drill holding spindle mounted on a reciprocating drill slide, a gear rotarily mounted on the spindle, a clutch device for securing the gear to the spindle, the slide supported on a swinging saddle, a feed-worm mounted on the saddle and in engagement with the drill slide to reciprocate it, the saddle pivoted to the bed, means for imparting a lateral swinging movement to the saddle, means for rotating the drill spindle, means for rotating the feed screw, and a cutter spindle supported in operative relation to the drill holding spindle, all substantially as described.

10. In combination in a machine for grooving drills, a frame or bed, a reciprocating drill holder supported on a saddle, the saddle pivoted to the bed, a worm supported on the saddle and meshing with a stationary worm gear, means for rotating the worm, and a cutter spindle supported in operative relation to the drill holder, all substantially as described.

11. In combination in a machine for grooving drills, a frame or bed, a drill holder supported on a saddle, the saddle pivoted to the bed, a worm shaft supported on the saddle and meshing with a stationary worm gear, a bevel gear shaft connected to the worm shaft, clutch mechanism connecting said shafts, means for rotating the bevel gear shaft, a cutter spindle supported in operative relation to the drill holder, and means for changing the relative position of the cutter spindle and drill holder in a plane parallel to the axis of the latter, all substantially as described.

12. In combination in a machine for grooving drills, a frame or bed, a drill holder supported on a swinging saddle, the saddle pivoted to the bed, a worm shaft supported on the saddle and meshing with a stationary worm gear, a worm rotarily mounted on a bevel gear shaft and meshing with the worm shaft, clutch mechanism secured to the bevel gear shaft and adapted to connect the two shafts last mentioned, an automatic clutch operating device, means for rotating the bevel gear shaft, a cutter spindle supported in operative relation to the drill holder, and means for changing the relative position of the cutter spindle and drill holder in a plane parallel to the axis of the latter, all substantially as described.

13. In combination in a machine for grooving drills, a drill holder supported on a reciprocating drill slide, the drill slide supported on a swinging saddle, a worm shaft mounted on the swinging saddle and in engagement with a stationary gear, a bevel gear shaft in engagement with said worm shaft, the bevel gear shaft in engagement with the drill holder, the feed screw mounted on the saddle and in engagement with the drill slide and bevel gear shaft, a feed worm shaft in mesh with the drill slide feed screw, and a cutter spindle mounted in operative relation to the drill holder, all substantially as described.

14. In combination in a machine for grooving drills, a drill holder supported on a reciprocating drill slide, the drill slide supported on a swinging saddle, a worm shaft mounted on the swinging saddle and in engagement with a stationary gear, a bevel gear shaft in engagement with said worm shaft, the bevel gear shaft in engagement with the drill holder, the feed screw mounted on the saddle and in engagement with the drill slide and bevel gear shaft, a feed worm shaft in mesh with the drill slide feed screw and borne on a swinging feed swivel box, the feed swivel box, a device for holding the drill slide feed screw and feed worm shaft in engagement, the automatic releasing device, and a cutter spindle mounted in operative relation to the drill holding spindle, all substantially as described.

15. In combination with the reciprocating drill holder of a machine for grooving drills, a base, an adjustable drill guide slide located on the base, and a separable drill guide supported on the slide, and means for moving the sections of said drill guide toward and from each other by the reciprocation of the slide, all substantially as described.

16. In combination with the reciprocating drill holder of a machine for grooving drills, a base, an adjustable guide slide located on the base, the adjusting screw connected to the base and slide, diagonal grooves located in the slide, separable drill guides located on the slide and having tongues resting in the grooves, and means for preventing the longitudinal movement of the drill guides whereby they are opened and closed as the slide is moved, all substantially as described.

MOSES C. JOHNSON.

Witnesses:
 B. A. HOUGH,
 ANSON W. BURCHARD.